United States Patent
Chang et al.

(10) Patent No.: US 8,356,656 B2
(45) Date of Patent: Jan. 22, 2013

(54) HEAT DISSIPATION DEVICE AND METHOD

(75) Inventors: Yu-Wei Chang, Taipei (TW); Hu-Sung Chang, Taipei (TW); Chao-Tsai Chung, Taipei (TW)

(73) Assignee: Pegatron Corporation, Taipei (TW)

( * ) Notice: Subject to any disclaimer, the term of this patent is extended or adjusted under 35 U.S.C. 154(b) by 714 days.

(21) Appl. No.: 12/556,782

(22) Filed: Sep. 10, 2009

(65) Prior Publication Data

US 2010/0065254 A1   Mar. 18, 2010

(30) Foreign Application Priority Data

Sep. 12, 2008  (TW) ................................ 97135023 A (51) Int. Cl.
*F28F 7/00* (2006.01)
*H05K 7/20* (2006.01)

(52) U.S. Cl. ........................ 165/80.2; 165/80.3; 165/122

(58) Field of Classification Search ................. 165/80.3, 165/104.33, 104.34, 122, 104.21, 147; 361/690, 361/695, 696, 697, 700, 679, 5, 679.51, 679.52, 361/679.54; 174/16.3, 15.2
See application file for complete search history.

(56) References Cited

U.S. PATENT DOCUMENTS

| | | | | |
|---|---|---|---|---|
| 5,077,601 | A * | 12/1991 | Hatada et al. | ................... 257/722 |
| 5,121,290 | A * | 6/1992 | Azar | ........................... 361/692 |
| 5,195,576 | A | 3/1993 | Hatada et al. | |
| 5,361,188 | A * | 11/1994 | Kondou et al. | ............... 361/695 |
| 5,563,768 | A * | 10/1996 | Perdue | .......................... 361/695 |
| 5,763,950 | A * | 6/1998 | Fujisaki et al. | ............... 257/712 |
| 5,810,072 | A * | 9/1998 | Rees et al. | ................... 165/80.3 |
| 6,474,409 | B1 | 11/2002 | Sterner | |
| 6,781,834 | B2 * | 8/2004 | Nair et al. | .................... 361/697 |
| 6,888,725 | B2 * | 5/2005 | Kubo et al. | ................... 361/719 |
| 7,787,247 | B2 * | 8/2010 | Han | ........................ 361/679.47 |
| 7,957,140 | B2 * | 6/2011 | Mongia | ........................ 361/695 |
| 2003/0136546 | A1 | 7/2003 | Zhang | |
| 2007/0171611 | A1 * | 7/2007 | Peng et al. | ..................... 361/695 |
| 2008/0204997 | A1 * | 8/2008 | Ye et al. | ........................ 361/695 |
| 2008/0239665 | A1 * | 10/2008 | Franz et al. | ................... 361/695 |

FOREIGN PATENT DOCUMENTS

CN      100410093 C     8/2008
JP      4168798 A      6/1992

OTHER PUBLICATIONS

English translation of abstract of CN 100410093 C.
English translation of abstract of JP 4168798 A.
Taiwan Office Action issued May 28, 2012.

* cited by examiner

*Primary Examiner* — Tho V Duong
(74) *Attorney, Agent, or Firm* — McClure, Qualey & Rodack, LLP (57) ABSTRACT

A heat dissipation device and a heat dissipation method are provided. The device is disposed in a case having a first opening and a fan for generating a first cooling air flow. The device includes a heat dissipation element and an air-guiding plate. The heat dissipation element has a first region and a second region, and the first cooling air flow flows from the first region towards the second region. The air-guiding plate is disposed in the first region of the heat dissipation element and used for reducing a cross-sectional area of the first cooling air flow flowing in the first region along a flow direction of the first cooling air flow, so as to draw air outside the case into the second region via the first opening to generate a second cooling air flow, thereby lowering a temperature of the case located below the heat dissipation element.

15 Claims, 12 Drawing Sheets

HEAT DISSIPATION DEVICE AND METHOD

CROSS-REFERENCES TO RELATED APPLICATIONS

This non-provisional application claims priority under 35 U.S.C. §119(a) on Patent Application No. 97135023 filed in Taiwan, R.O.C. on Sep. 12, 2008, the entire contents of which are hereby incorporated by reference.

BACKGROUND

1. Technical Field

The present invention relates to a heat dissipation device and a heat dissipation method, and more particularly to a heat dissipation device and a heat dissipation method applicable to lower a temperature of a case located below a heat dissipation element.

2. Related Art

As the performance of notebooks becomes increasingly high, more and more users have abandoned bulky desktops to use notebooks that are light, thin, short, and small. However, in order to enable the performance of the notebooks to be comparable to that of the desktops, the first problem to be solved is to effectively dissipate a large amount of heat energy generated by a central processing unit (CPU) and computer chips during operation within a rather narrow space.

In a common notebook, the heat generated by a CPU and computer chips during operation is guided via a heat pipe to a heat dissipation element formed by a plurality of heat sinks assembled to each other in parallel, and then a fan is used for cooling. Thus, after the notebook works for a period of time, the hottest place of the case is always a position below the heat dissipation element, and that is because most of the heat generated by main heat generating elements of the notebook is guided to this position. Although a small gap exists between the heat dissipation element and the case, and the heat dissipation element has no substantial thermal contact with the case, the heat of the heat dissipation element is still unavoidably conducted to the case due to a quite short distance therebetween, which results in a higher temperature of the case at this position.

The small size and small thickness of the notebook result in a vary small distance between the case and the heat dissipation device, and thus the user easily feels hot due to the heat conducted from the heat dissipation device inside the case while operating the notebook. Although the increased rotation speed of the fan is helpful for heat dissipation, it also increases the power consumption of the notebook correspondingly. In addition, the noise caused by the increased rotation speed of the fan also brings trouble to the user in operation.

SUMMARY

Accordingly, the present invention provides a heat dissipation device, which is disposed in a case having a first opening, and a fan is disposed in the case for generating a first cooling air flow. The heat dissipation device includes a heat dissipation element and an air-guiding plate. The heat dissipation element has a first region and a second region, and the first cooling air flow flows from the first region towards the second region. The air-guiding plate is disposed in the first region of the heat dissipation element and used for reducing a cross-sectional area of the first cooling air flow flowing in the first region along a flow direction of the first cooling air flow, so as to draw air outside the case into the second region via the first opening to generate a second cooling air flow.

When the first cooling air flow flows from the first region towards the second region of the heat dissipation element, the air-guiding plate disposed in the first region reduces the cross-sectional area of the first cooling air flow flowing in the first region along the flow direction of the first cooling air flow. Then, a low pressure region is formed under the Bernoulli theorem, and due to the low pressure region, the air outside the case is drawn into the second region via the first opening to generate a second cooling air flow. In this way, the second cooling air flow reduces a temperature of the case located below the heat dissipation element.

In addition, the present invention also provides a heat dissipation method, which is applicable to a case having a first opening. The heat dissipation method includes the following steps. First, a heat dissipation element having a first region and a second region is disposed in the case. Afterwards, a first cooling air flow is generated to flow from the first region towards the second region. Then, a cross-sectional area of the first cooling air flow flowing in the first region is reduced along a flow direction of the first cooling air flow, so that a low pressure region is formed under the Bernoulli theorem, and due to the low pressure region, air outside the case is drawn into the second region via the first opening to generate a second cooling air flow. In this way, a temperature of the case located below the heat dissipation element is reduced by the second cooling air flow.

DETAILED DESCRIPTION

The technical contents, features, and efficacies of the present invention are illustrated below with reference to the drawings and embodiments.

Figure 1A:
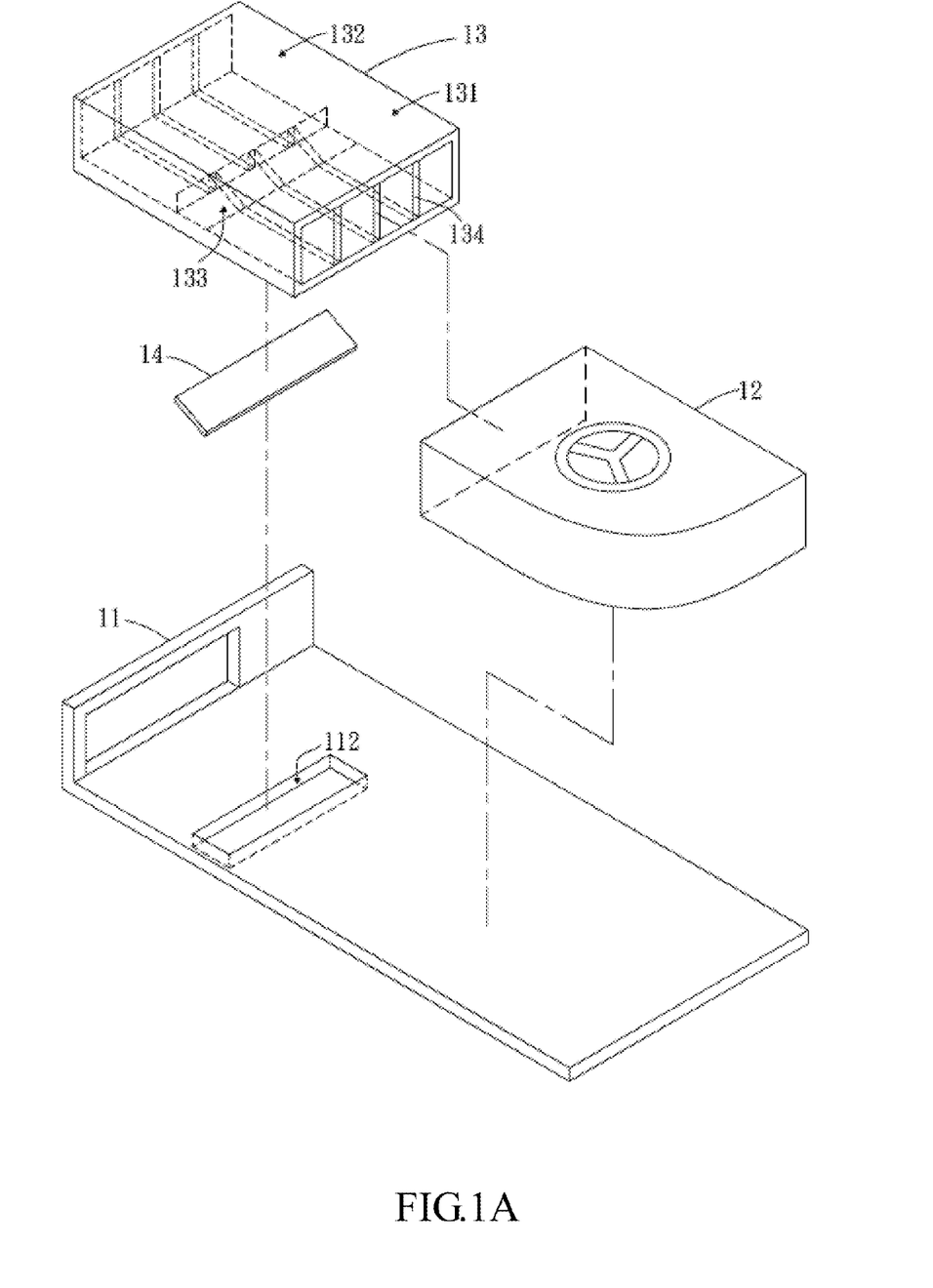
FIG. 1A is a schematic assembly view of a first embodiment of the present invention.
Figure 1B:
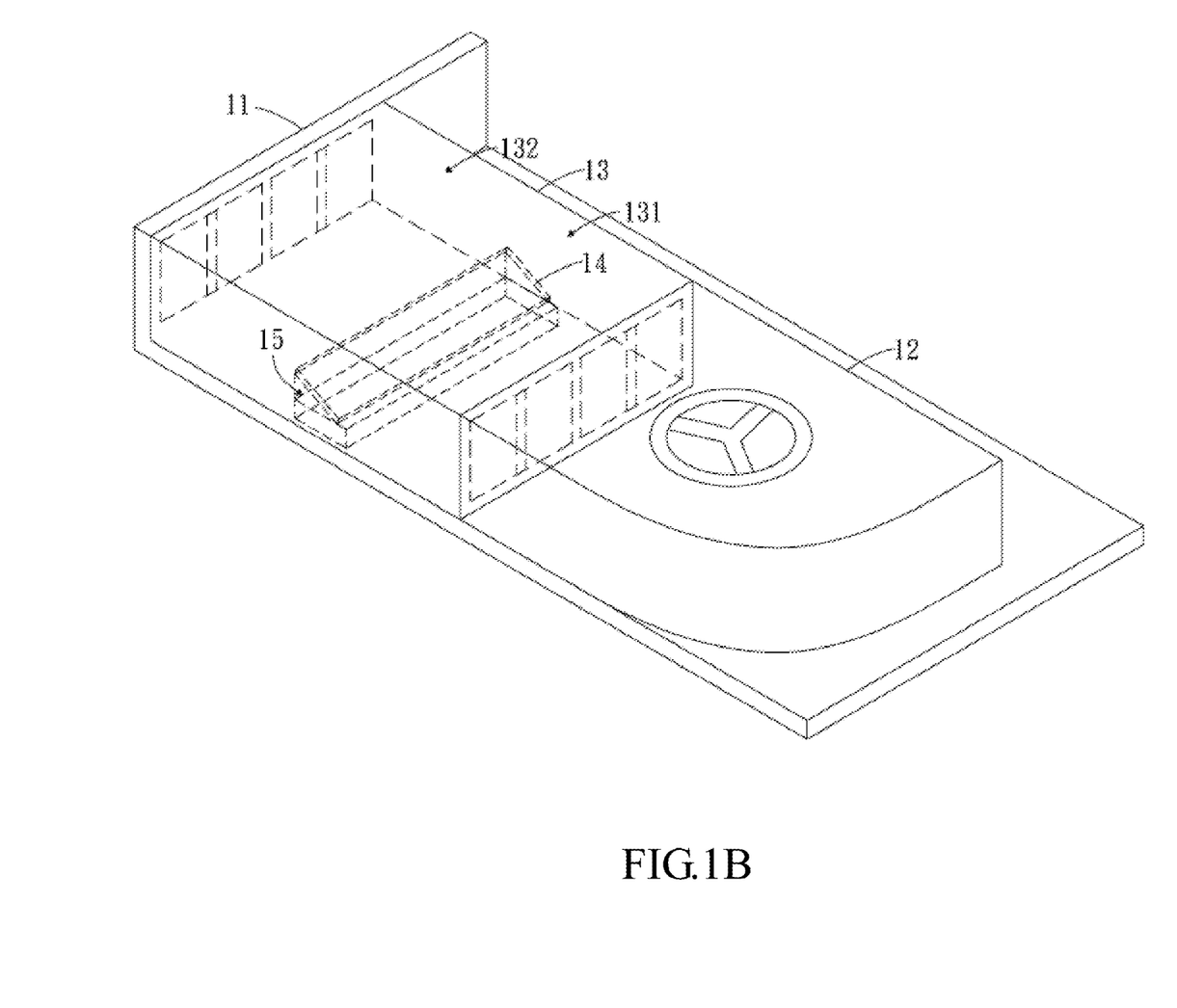
FIG. 1B is a perspective view of the first embodiment of the present invention.
Figure 1C:
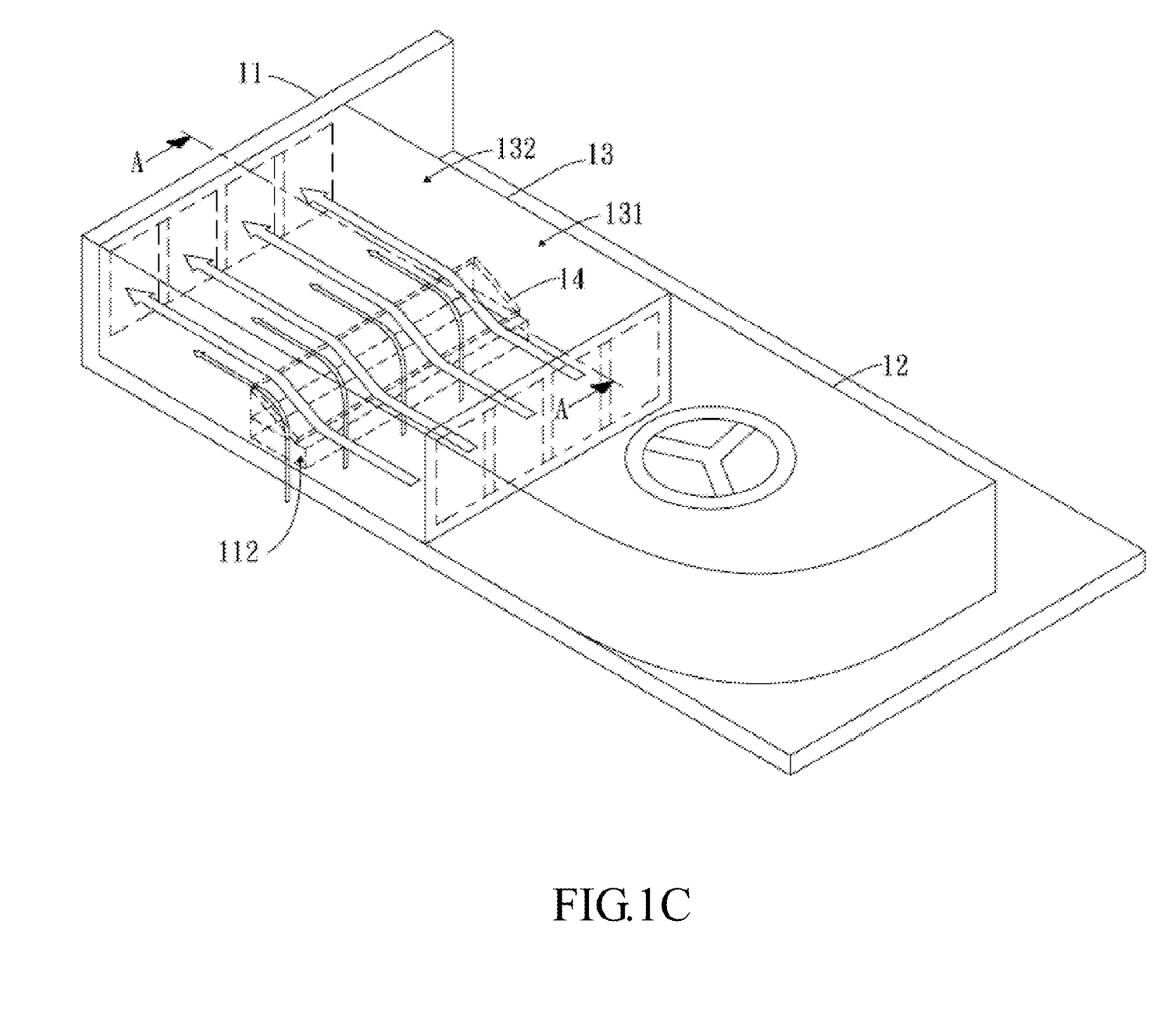
FIG. 1C is a schematic view of a cooling air flow of the first embodiment of the present invention.
Figure 1D:
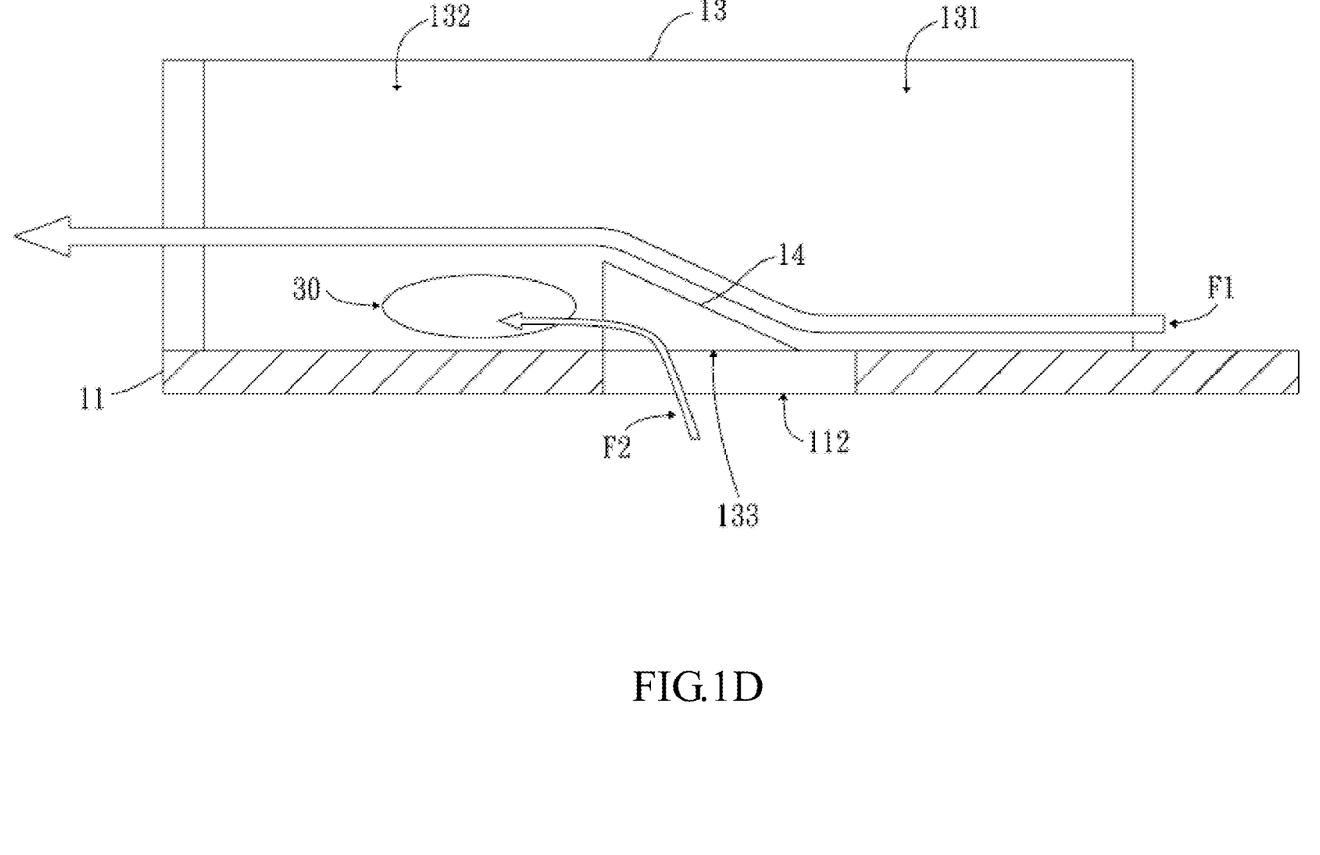
FIG. 1D is a cross-sectional view taken along a section line A-A.

FIGS. 1A to 1D are respectively a schematic assembly view of a first embodiment of the present invention, a perspective view of the first embodiment of the present invention, a schematic view of a cooling air flow of the first embodiment of the present invention, and a cross-sectional view taken along a section line A-A. A heat dissipation device in this embodiment is disposed in a case 11 having a first opening 112 (only a part of the case 11 is shown). A fan 12 is disposed in the case 11 for generating a first cooling air flow F1. The heat dissipation device in this embodiment includes a heat dissipation element 13 and an air-guiding plate 14. The heat dissipation element 13 has a first region 131, a second region 132, and a second opening 133. The first cooling air flow F1 flows from the first region 131 towards the second region 132 of the heat dissipation element 13. The air-guiding plate 14 is disposed in the first region 131 of the heat dissipation element 13 and used for reducing a cross-sectional area of the first cooling air flow F1 flowing in the first region 131 along a flow direction of the first cooling air flow F1, so that a low pressure region 30 is formed under the Bernoulli theorem, and due to the low pressure region 30, the air outside the case 11 is drawn to flow towards the second opening 133 via the first opening 112 and is guided into the second region 132, so as to generate a second cooling air flow F2, as shown in FIG. 1D.

In addition, the air-guiding plate 14 in this embodiment forms an included angle 15 with the first opening 112, and the included angle 15 is larger than 0 degrees and smaller than or equal to 90 degrees.

Besides, the heat dissipation element 13 includes a plurality of heat sinks 134. The plurality of heat sinks 134 is assembled to each other in parallel to form the heat dissipation element 13, which is a conventional method for fabricating the heat dissipation element 13, so that the detailed assembling process is not described herein again.

Figure 2A:
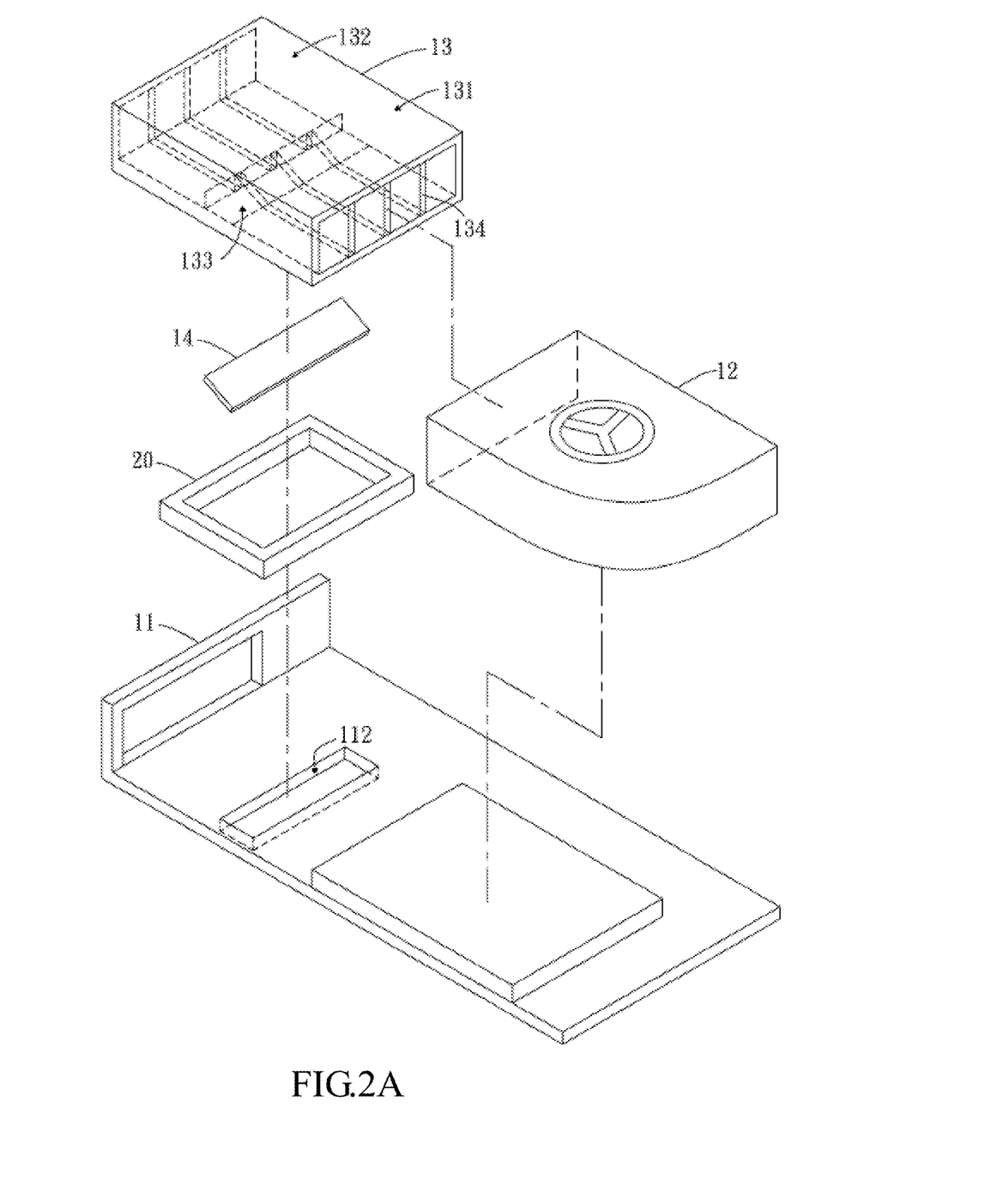
FIG. 2A is a schematic assembly view of a second embodiment of the present invention.
Figure 2B:
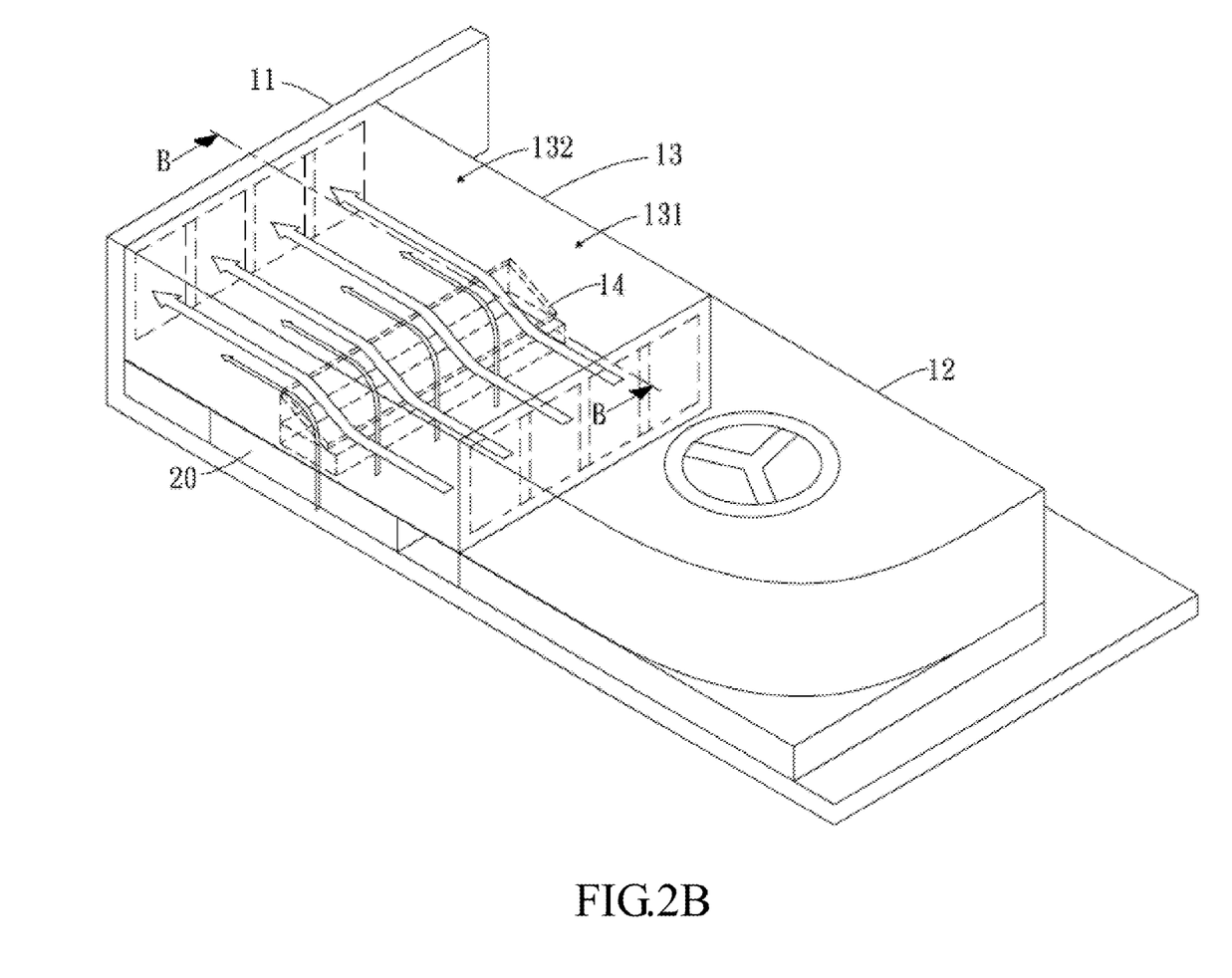
FIG. 2B is a schematic view of a cooling air flow of the second embodiment of the present invention.
Figure 2C:
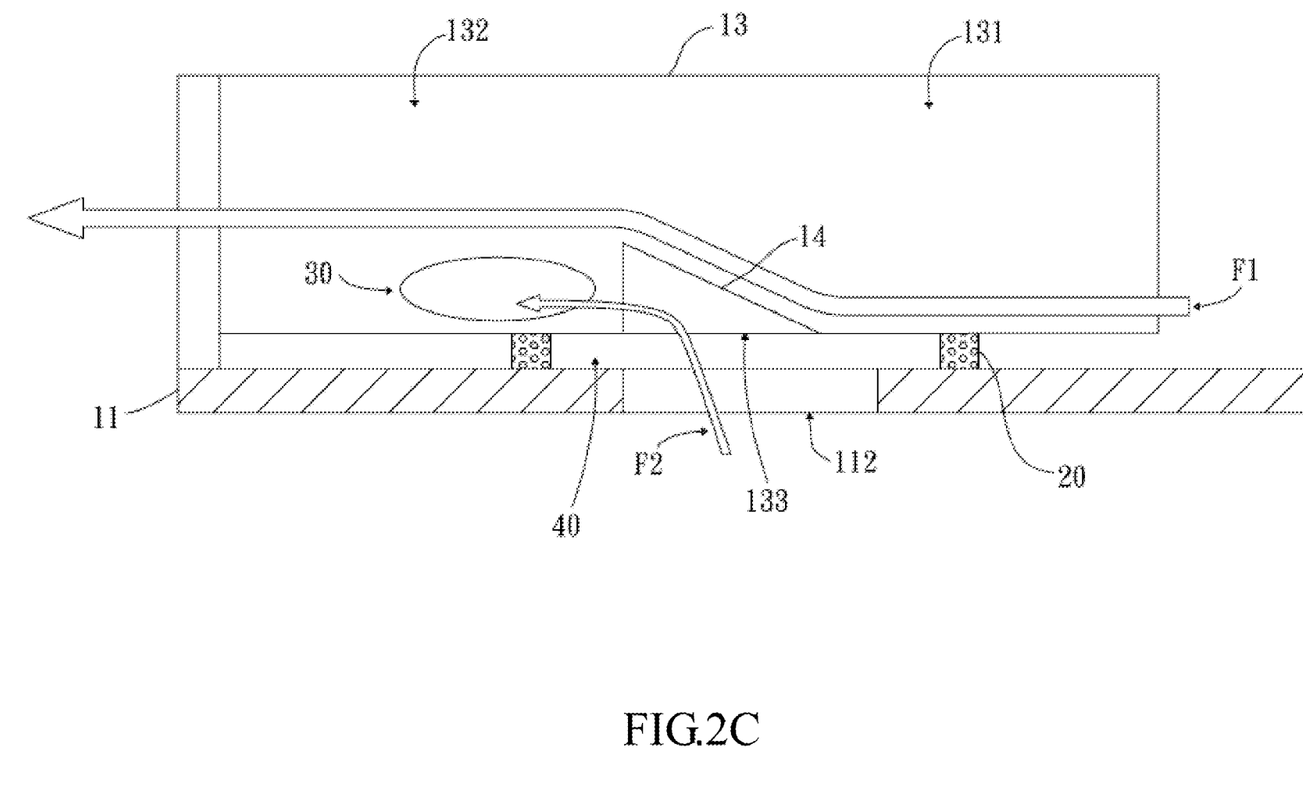
FIG. 2C is a cross-sectional view taken along a section line B-B.

FIGS. 2A to 2C are respectively a schematic assembly view of a second embodiment of the present invention, a schematic view of a cooling air flow of the second embodiment of the present invention, and a cross-sectional view taken along a section line B-B. The difference between this embodiment and the first embodiment lies in that, a baffle wall 20 is further disposed between the heat dissipation element 13 and the first opening 112 in an encircling manner. The baffle wall 20, the case 11, and the heat dissipation element 13 form an independent space 40. The baffle wall 20 maintains a gap between the heat dissipation element 13 and the case 11 to reduce the heat conducted from the heat dissipation element 13 to the case 11. In addition, the independent space 40 formed by the baffle wall 20 together with the case 11 and the heat dissipation element 13 further ensures that the second cooling air flow F2 can flow from the first opening 112 towards the second opening 133 and be guided into the second region 132 of the heat dissipation element 13 fluently. Compared with the first embodiment, this embodiment achieves a better effect in lowering the temperature of the case 11.

Figure 3A:
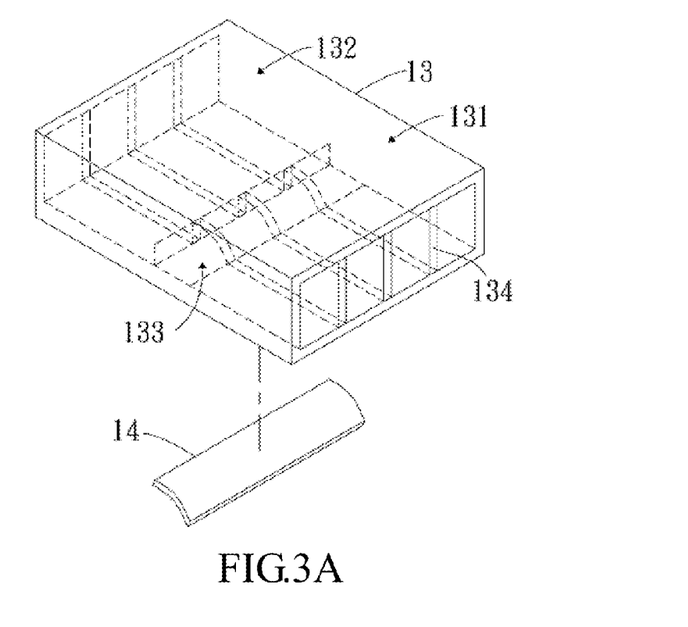
FIG. 3A is a schematic view (1) of an air-guiding plate in the present invention.
Figure 3B:
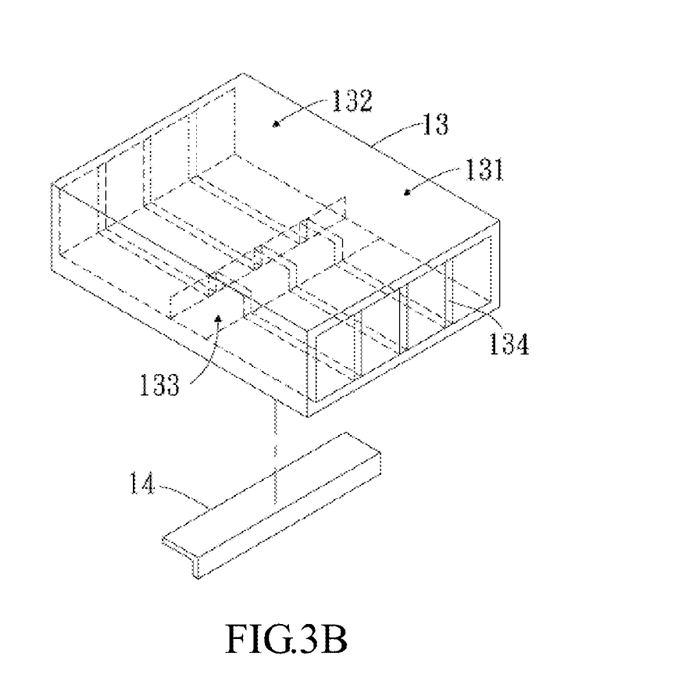
FIG. 3B is a schematic view (2) of the air-guiding plate in the present invention.

The air-guiding plates 14 in the first embodiment and the second embodiment of the present invention are both of a flat surface. However, a profile of the air-guiding plate 14 is selected from a group consisting of a curved surface, a flat surface, and any combination thereof. Referring to FIG. 3A, the air-guiding plate 14 is of a curved surface. In addition, referring to FIG. 3B, the profile of the air-guiding plate 14 is two flat surfaces perpendicular to each other.

Figure 4:
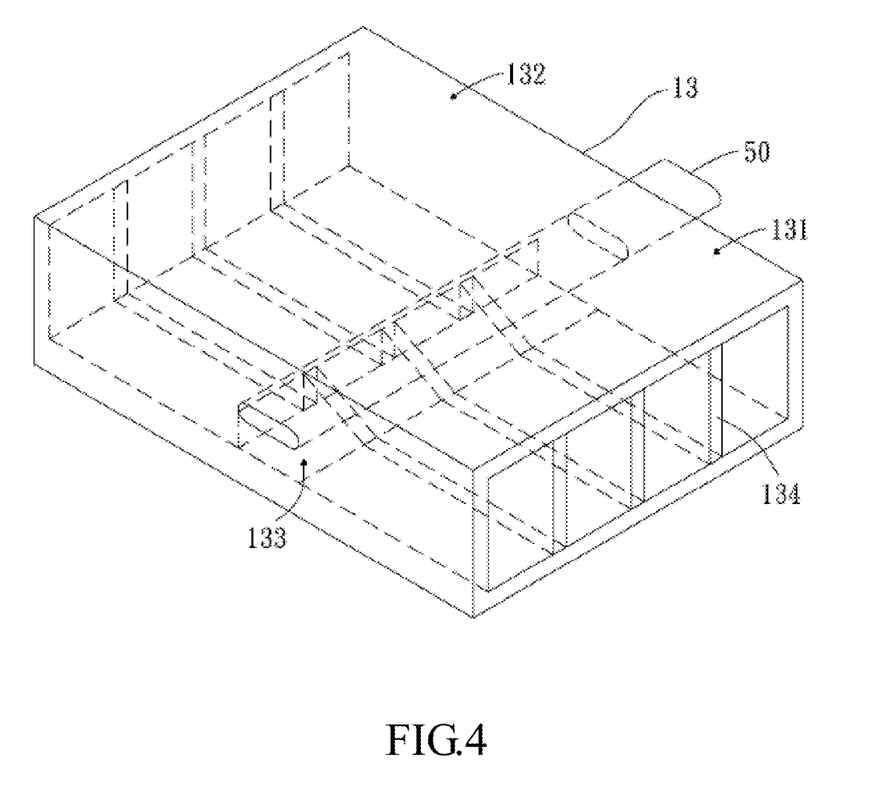
FIG. 4 is a schematic view of a heat pipe.

FIG. 4 is a schematic view of a heat pipe. The heat pipe 50 passes through the heat dissipation element 13.

Figure 5:
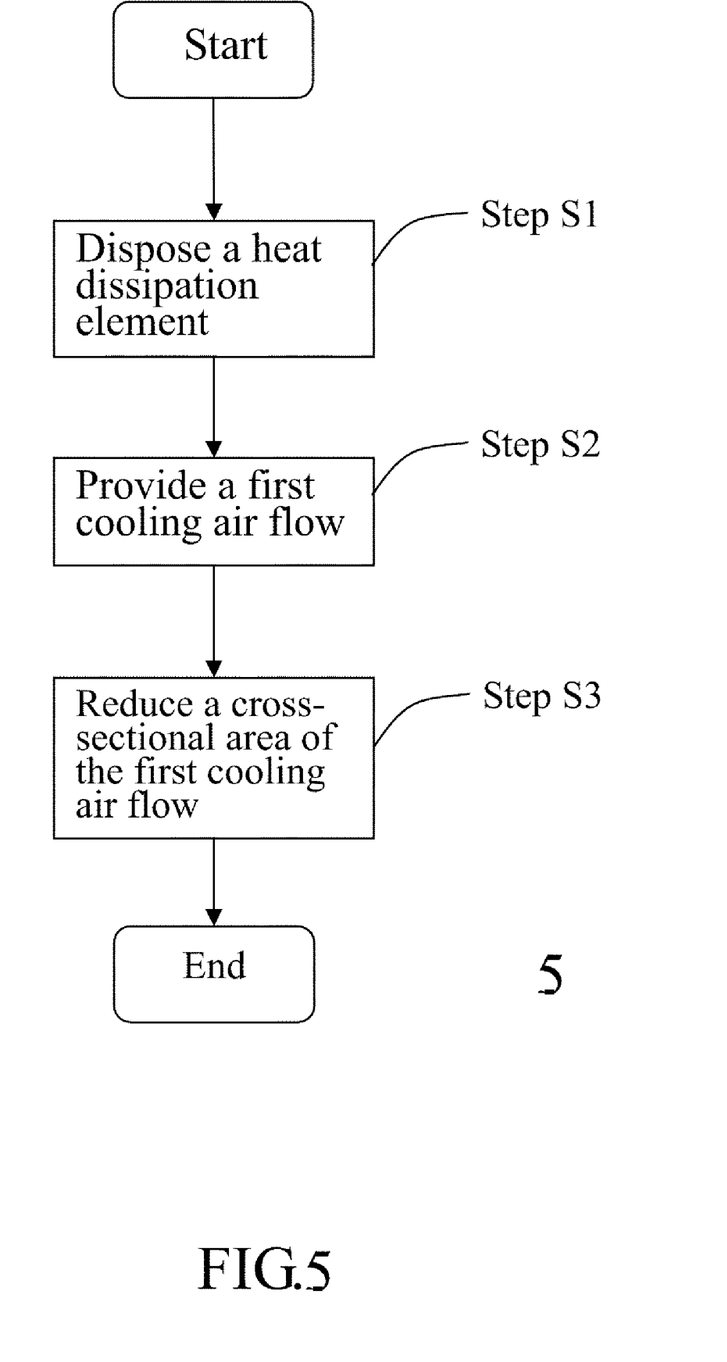
FIG. 5 is a flow chart of a heat dissipation method in the present invention.

FIG. 5 is a flow chart of a heat dissipation method in the present invention, which is applicable to a case 11 having a first opening 112. The case 11 is a chassis of a notebook or a chassis of a game console. The heat dissipation method includes the following steps.

In Step S1, a heat dissipation element is disposed.

A heat dissipation element 13 having a first region 131 and a second region 132 is disposed in the case 11.

In addition, the heat dissipation element 13 in this step has a second opening 133 and is formed by a plurality of heat sinks 134 assembled to each other in parallel.

In Step S2, a first cooling air flow is provided.

A fan 12 is used to generate a first cooling air flow F1 and enables the first cooling air flow F1 to flow from the first region 131 towards the second region 132 of the heat dissipation element 13.

In Step S3, a cross-sectional area of the first cooling air flow is reduced.

A cross-sectional area of the first cooling air flow F1 flowing in the first region 131 is reduced along a flow direction of the first cooling air flow F1, a low pressure region 30 is formed under the Bernoulli theorem, and due to the low pressure region 30, the air outside the case 11 is drawn into the second region 132 via the first opening 112 to generate a second cooling air flow F2. The second cooling air flow F2 flows into the second region 132 of the heat dissipation element 13, thereby lowering the temperature of the case 11 located below the heat dissipation element 13.

In addition, in Step S3, an air-guiding plate 14 is disposed in the first region 131 of the heat dissipation element 13 and used for reducing the cross-sectional area of the first cooling air flow F1 flowing in the first region 131 along the flow direction of the first cooling air flow F1. The air-guiding plate 14 forms an included angle 15 with the first opening 112. As shown in FIG. 1B, the included angle 15 is larger than 0 degrees and smaller than or equal to 90 degrees.

Besides, the method further includes forming an independent space 40 between the case 11 and the heat dissipation element 13. Specifically, the independent space 40 is formed by disposing a baffle wall 20 between the heat dissipation element 13 and the first opening 112 of the case 11 in an encircling manner. The baffle wall 20 maintains a gap between the heat dissipation element 13 and the case 11 to reduce the heat conducted from the heat dissipation element 13 to the case 11. In addition, the independent space 40 further ensures that the second cooling air flow F2 can flow from the first opening 112 of the case 11 towards the second opening 133 of the heat dissipation element 13 and be guided into the second region 132 fluently.

In addition, the method further includes passing a heat pipe 50 through the heat dissipation element 13.

Based on the above, in the present invention, the first cooling air flow F1 flows from the first region 131 towards the second region 132 of the heat dissipation element 13, and the air-guiding plate 14 reduces the cross-sectional area of the first cooling air flow F1 flowing in the first region 131 along the flow direction of the first cooling air flow F1, so that the low pressure region 30 is formed under the Bernoulli theorem, and due to the low pressure region 30, the air outside the case 11 is drawn into the second region 132 via the first opening 112 to generate the second cooling air flow F2. Since the air temperature outside the case 11 is usually lower than that inside the case 11, the second cooling air flow F2 can lower the temperature of the case 11 located below the heat dissipation element 13.

Figure 6A:
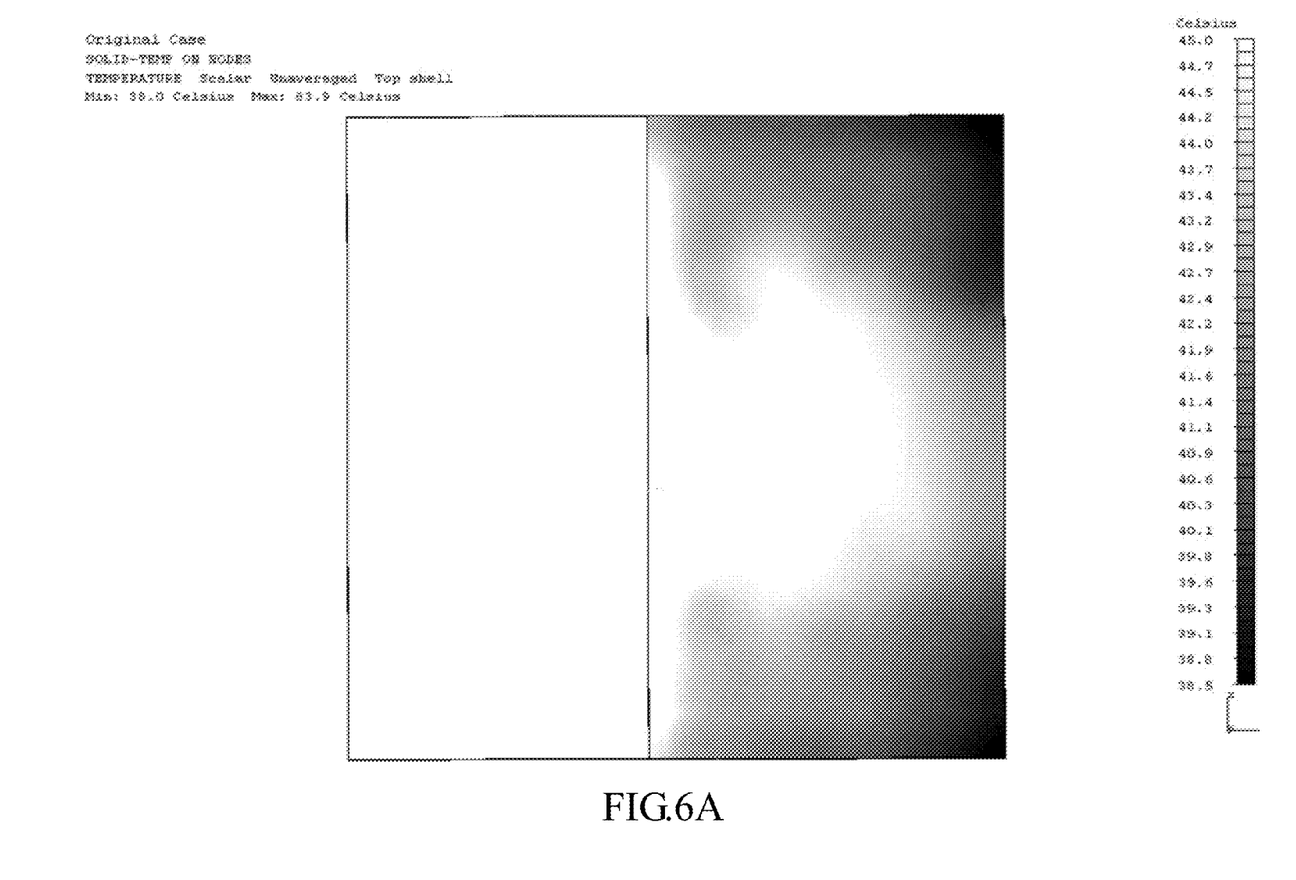
FIG. 6A is a thermal simulation analysis diagram of a part of a case in the prior art.
Figure 6B:
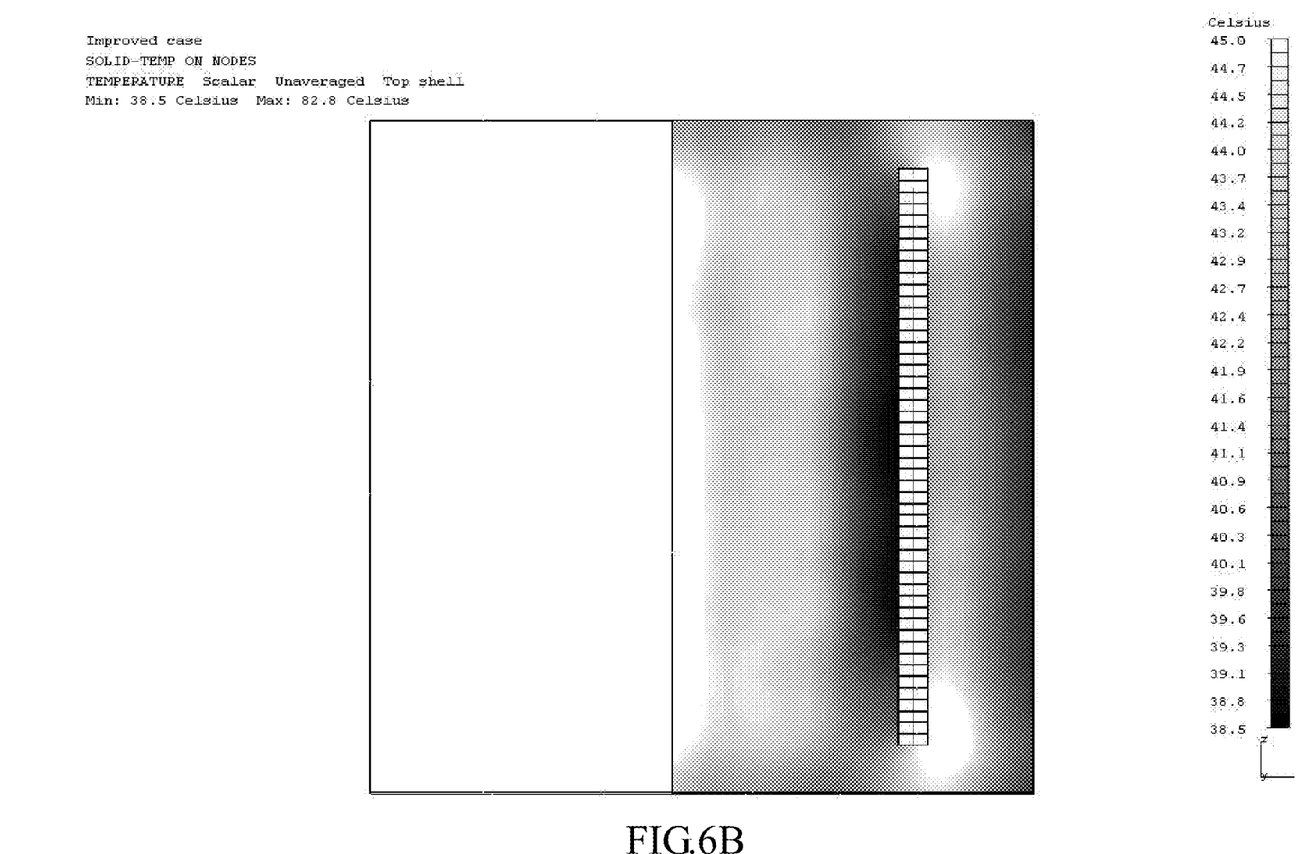
FIG. 6B is a thermal simulation analysis diagram of a part of a case in the present invention.

FIGS. 6A and 6B are respectively a thermal simulation analysis diagram of a part of a case in the prior art and a thermal simulation analysis diagram of a part of a case in the present invention. The thermal simulation analysis is performed on the case 11 located below the heat dissipation element 13. As known from the comparison between FIG. 6A and FIG. 6B, the temperature of the case 11 located below the heat dissipation element 13 is reduced by about 1.5° C. through the present invention.

While the present invention has been described by the way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A heat dissipation device, disposed in a chassis of an electronic device having a first opening, a fan disposed in the chassis of an electronic device generating a first cooling air flow, the heat dissipation device comprising:
   a heat dissipation element, having a first region and a second region, the first cooling air flow flowing from the first region towards the second region;
   an air-guiding plate, disposed in the first region, for reducing a cross-sectional area of the first cooling air flow flowing in the first region along a flow direction of the first cooling air flow, so as to draw air outside the chassis of an electronic device into the second region via the first opening to generate a second cooling air flow; and
   a baffle wall, disposed between the heat dissipation element and the first opening in an encircling manner, wherein the baffle wall, the chassis, and the heat dissipation element form an independent space.

2. The heat dissipation device according to claim 1, wherein the air-guiding plate forms a comprised angle with the first opening.

3. The heat dissipation device according to claim 2, wherein the comprised angle is larger than 0 degrees and smaller than or equal to 90 degrees.

4. The heat dissipation device according to claim 2, wherein a profile of the air-guiding plate is selected from a group consisting of a curved surface, a flat surface, and any combination thereof.

5. The heat dissipation device according to claim 1, wherein the heat dissipation element is formed by a plurality of heat sinks assembled to each other in parallel.

6. The heat dissipation device according to claim 1, wherein the heat dissipation element has a second opening disposed close to the first opening, and the second opening enables the second cooling air flow to flow into the heat dissipation element.

7. The heat dissipation device according to claim 1, further comprising: a heat pipe, passing through the heat dissipation element.

8. A heat dissipation method, applicable to a chassis of an electronic device having a first opening, the heat dissipation method comprising:
   disposing a heat dissipation element in the chassis of an electronic device, wherein the heat dissipation element has a first region and a second region;
   generating a first cooling air flow to flow from the first region towards the second region;
   reducing a cross-sectional area of the first cooling air flow flowing in the first region along a flow direction of the first cooling air flow, so as to draw air outside the chassis of an electronic device into the second region via the first opening to generate a second cooling air flow; and
   forming an independent space, formed by disposing a baffle wall between the heat dissipation element and the first opening of the chassis in an encircling manner, between the heat dissipation element and the chassis.

9. The heat dissipation method according to claim 8, wherein an air-guiding plate is disposed in the first region and used for reducing the cross-sectional area of the first cooling air flow flowing in the first region along the flow direction of the first cooling air flow.

10. The heat dissipation method according to claim 9, wherein the air-guiding plate forms a comprised angle with the first opening.

11. The heat dissipation method according to claim 10, wherein the comprised angle is larger than 0 degrees and smaller than or equal to 90 degrees.

12. The heat dissipation method according to claim 9, wherein a profile of the air-guiding plate is selected from a group consisting of a curved surface, a flat surface, and any combination thereof.

13. The heat dissipation method according to claim 8, wherein the heat dissipation element is formed by a plurality of heat sinks assembled to each other in parallel.

14. The heat dissipation method according to claim 8, further comprising:
   disposing a second opening at the heat dissipation element close to the first opening, wherein the second opening enables the second cooling air flow to flow into the heat dissipation element.

15. The heat dissipation method according to claim 8, further comprising:
   passing a heat pipe through the heat dissipation element.

* * * * *